Nov. 14, 1939.  W. H. LAMP  2,179,937
BALING MACHINE
Filed Oct. 14, 1938   3 Sheets-Sheet 1
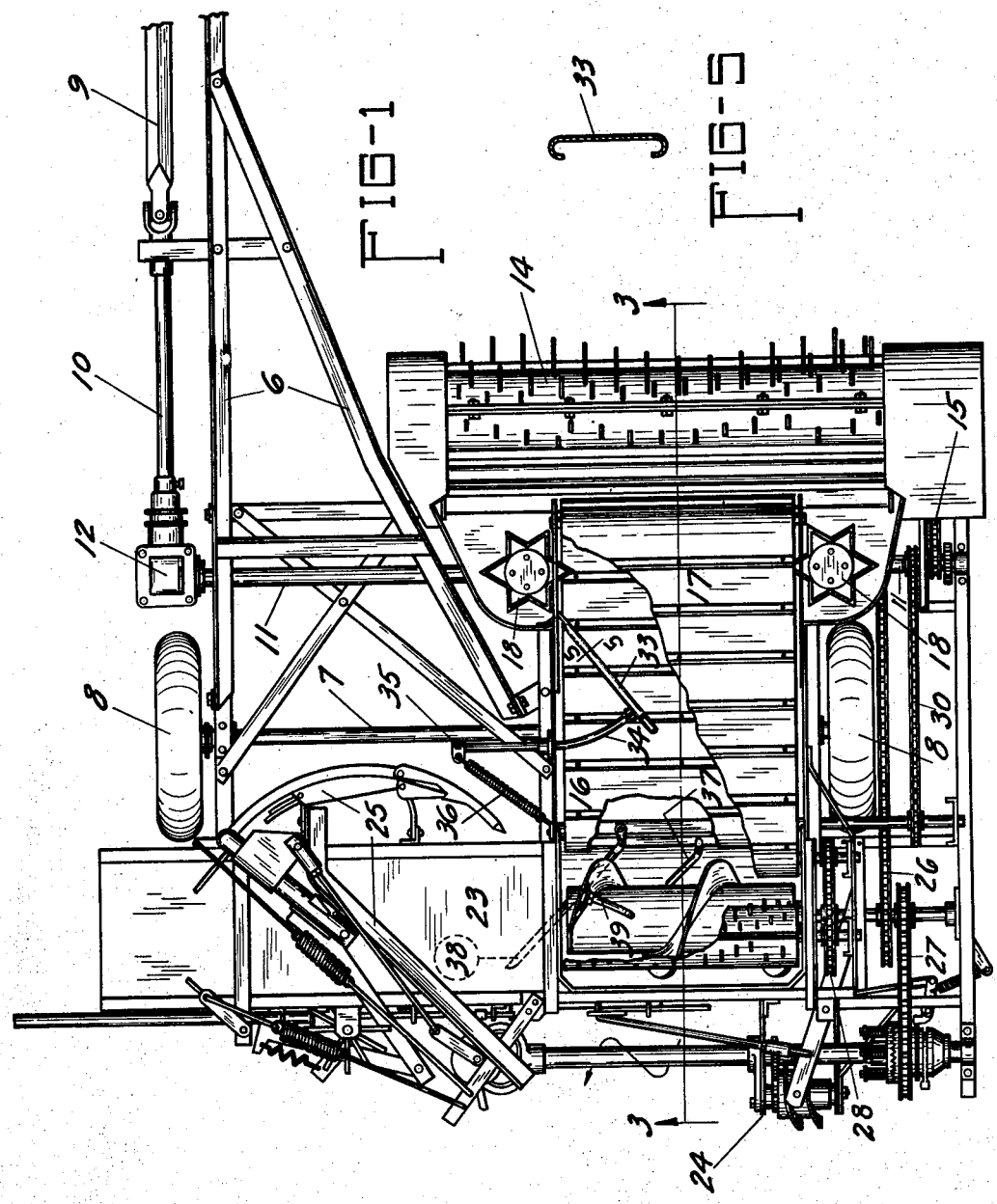
WILBERT H. LAMP INVENTOR.
BY *William C. Blackburn*
ATTORNEY.

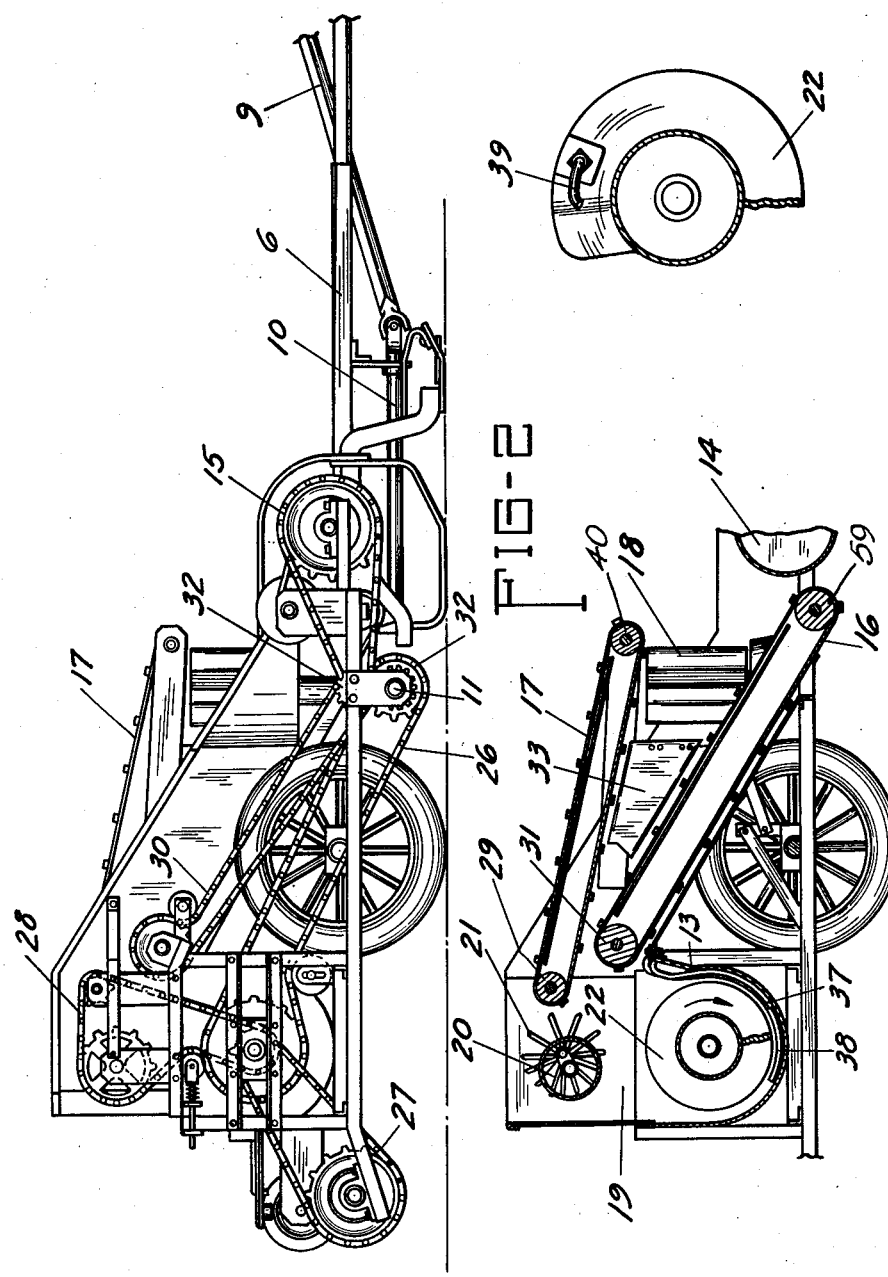

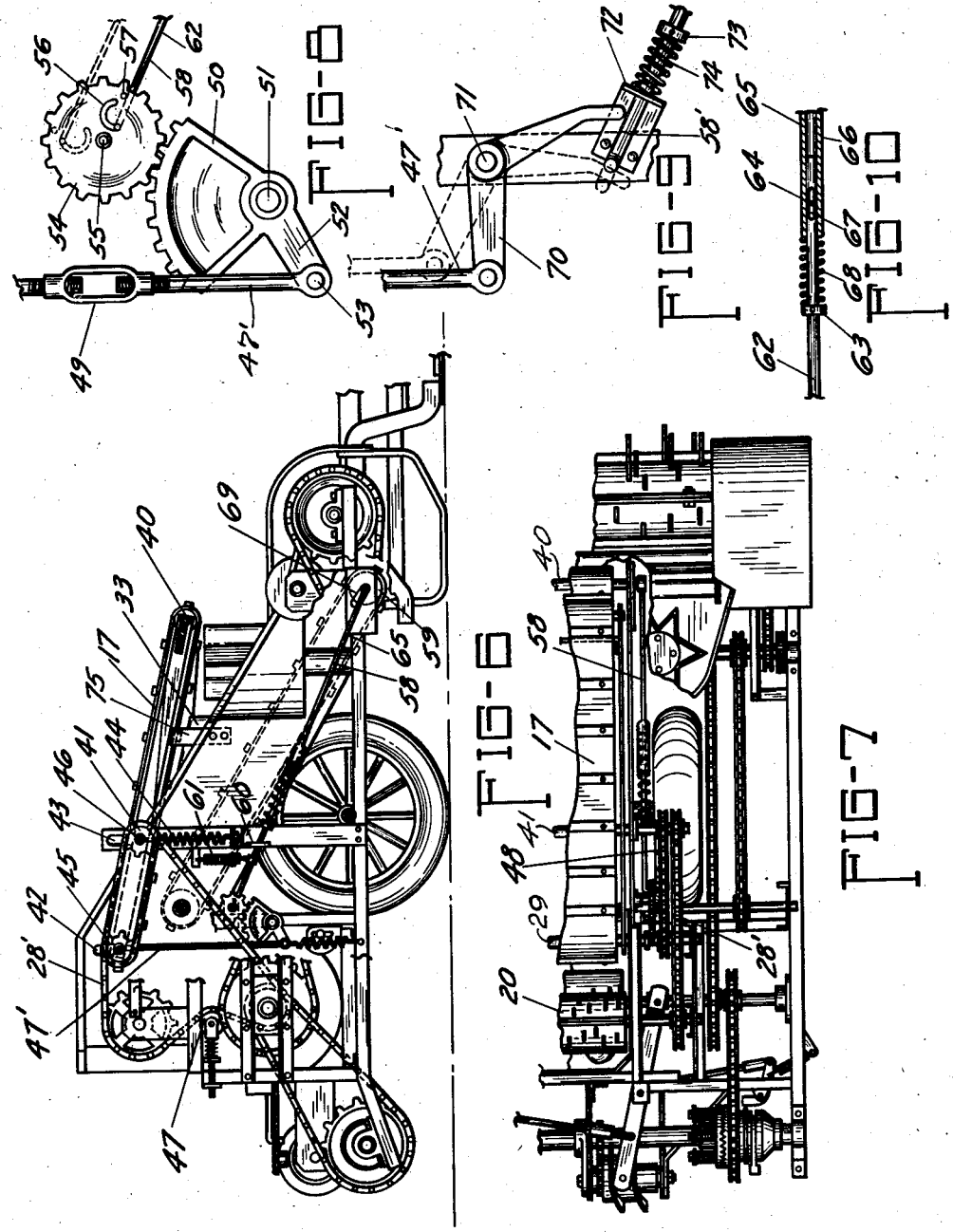

Patented Nov. 14, 1939

2,179,937

UNITED STATES PATENT OFFICE 2,179,937

BALING MACHINE

Wilbert H. Lamp, near Davenport, Iowa

Application October 14, 1938, Serial No. 234,990

13 Claims. (Cl. 100—13)

The present invention relates to improvements in baling machines of the type employing a baling auger, by which a hollow or cylindrical bale is produced. Machines of the character to which this invention relates may be employed for baling stalks of many characters including not only the stalks of the small grains but also hay, unthreshed stalks of the small grains but also hay, unthreshed grain, rice, and corn stalks. If desired, the baler may be used as a stationary unit and the stalks or other vegetable fibers, which are herein all generically termed straw, fed to the baler. If preferred, the baler may be built into a mobile unit, as shown in the drawings, and either provided with a pick-up or with means to deliver straw from a thresher directly to the baler.

Objects of the present invention are to provide a baler which will produce bales which are more firm, which have the straw more evenly distributed about the opening through the bale, and which contain a greater weight per bale than are produced by the balers known in the art of the type here involved.

In the type of mobile baler to which this invention relates, a pair of feed belts are employed to feed the straw into a compartment containing an auger. In theory, the straw is evenly distributed throughout the area between these belts and is discharged therefrom in a loose condition into the compartment. However, in practical operation, the straw in a windrow does not lie evenly but there are places along the windrow where there is much more straw than at other places. When such a bunch of straw is picked up and fed between the belts, the straw will be packed into a rather solid mass as the belts converge and the mass will proceed with difficulty into the compartment. If such a mass of straw does succeed in clearing the belt and entering the auger chamber, the mass will not be spiraled properly to form the bale but will move as a mass into the baling compartment, thereby producing a defective bale.

It is accordingly a further object of the present invention to provide a mechanism which will prevent the formation of solid masses of straw between the belts due to unevenness of the amount of straw in the windrow but which will feed the straw evenly into the auger chamber despite unevenness in the amount of straw in the windrow.

A more complete understanding of the present invention may be had from, and further objects and advantages will be apparent from the following description taken in conjunction with the accompanying drawings in which:

Fig. 1 is a plan view of a mobile pick-up baler embodying the improvements to which the present invention relates;

Fig. 2 is a left end elevation of the machine shown in Fig. 1;

Fig. 3 is a section substantially on the plane indicated by the line 3—3 in Fig. 1;

Fig. 4 is a section of the baler auger showing the last flight thereof, looking in the direction of the delivery end thereof;

Fig. 5 is a section of the material guide substantially on the plane of the line 5—5 in Fig. 1;

Fig. 6 is a side elevation of a baler embodying my improvements which allow the machine to handle unusually heavy feeds of straw, and which promote action in such feeds of straw of the spiraling devices shown in Figs. 1 to 6;

Fig. 7 is a plan view of the operative devices shown in Fig. 6 for clearing heavy feeds;

Fig. 8 is a detail of the release for the belt-driving mechanism as shown in Fig. 6;

Fig. 9 is a modified form of the belt release mechanism shown in Fig. 8; and

Fig. 10 is a detail of a portion of the rod which connects the release mechanism with the driving roller of the belt feed.

In the machine shown, a draft frame 6 is carried by a wheel shaft 7, to each end of which a wheel 8 is secured. The forward end of the draft frame may be arranged to be secured to a tractor or the like. A power shaft 9 is arranged to be driven by the tractor and is connected by a universal to shaft 10 which is supported by the frame 6. This shaft 10 is in driving engagement with shaft 11 through the gear box 12.

A pick-up 14 of well known type, involving a cylinder rotatable on its central axis and a plurality of fingers extending through openings in the cylinder and rotatable on an axis lower than the cylinder axis, is arranged to be carried by the frame 6 forward of the shaft 11. A chain 15 engages a sprocket on shaft 11 and is operatively connected with the pick-up.

An endless conveyor belt 16 has its forward end positioned slightly to the rear and below pick-up 14 in order to receive straw therefrom. The rearward end of belt 16 is positioned above the forward end and in proximity to the feed opening of the baling hopper. A second endless conveyor belt 17 has the forward end thereof positioned considerably above the forward end of belt 16 and has the rear end thereof positioned slightly to the rear of belt 16 and at an elevation so that the lower run of belt 17 is in proximity to the rearward end of the belt 16. The belts 16 and 17, being positioned as described, converge rearwardly and have a large intake opening between the forward ends and a relatively small outlet opening between the rearward ends thereof.

A spinner 18 is positioned adjacent to and at the rear of each end of the pick-up 14, the spinners being driven from the shaft 11 in such directions that the adjacent sides of the spinners move to the rear. These spinners 18 are employed to condense the straw, i. e., to reduce the width of the path of travel from a width equal to the length of the pick-up to the width of the belts 16 and 17.

A hopper 19 is positioned at the rear of the belts 16 and 17 and so arranged as to receive straw therefrom. In the upper portion of this hopper in line with the belts, a roll 20, similar in construction to the pick-up 14, is positioned. The roll 20 turns clockwise, as seen in Fig. 3, and the arms 21 extend the greatest distance out of the drum on the forward side of the roll, whereby straw delivered by the belts is carried down into the lower part of the hopper. Auger 22 is positioned in the lower part of the hopper, and the bottom wall of the hopper is, in general, shaped to conform to the cylindrical shape of the auger. In the machine shown, the auger has a left hand flight and is rotatable clockwise, as viewed in Fig. 3. Alternatively, however, the auger may have a right hand flight and be rotatable counterclockwise.

A baling compartment 23 is located adjacent the delivery end of the auger and communicates with the lower part of the hopper. An auger-shifting device 24 and a bale-tying device 25, substantially the same as shown in U. S. Patent No. 2,030,031, may be employed. Any suitable drive from the shaft 11 to the various operating parts may be provided. Thus a chain 26 may be driven by shaft 11 and directly drive the shaft of the auger. Chain 27, driven by the auger shaft, may be arranged to drive the tying mechanism. Chain 28, also driven from the auger shaft, may be arranged to drive the roll 20 and belt roll 29 which is in driving engagement with the upper belt 17. The lower belt 16 is driven by a chain 30 which drives belt roll 31, the chain being driven through a pair of gears 32, one of which is on the shaft 11.

The above described structure is the invention of others and I make no claim to invention in the machine as above described. My invention lies in the combination resulting from the addition of certain parts to the above described structure. The present invention effects substantial improvements in the operation of machines of the nature described.

In accordance with my present invention, I hingedly connect a straw-director 33 immediately to the rear of the spinner 18 on the bale-delivery side of the machine. This straw-director is pivotally connected to the wall of the machine and swings between the belts. An arm 34 is pivoted to the rear face of the director 33 and extends through an opening in the side wall of the machine. The outer end 35 of the arm is connected by a spring 36 to the wall so as normally to bias the director 33 into the path of the straw between the belts.

A pair of bars 37, 38 is secured at an end of each of them to the forward upper edge of the hopper, which edge is midway the height of the hopper and over which the straw is delivered. Each of the bars 37, 38 extends between the lower wall of the hopper and the auger and lies in a vertical plane which is at an angle of about 30° to 60° and preferably about 45° to the axis of the auger. The bars are spaced at different distances from the feed end of the auger, and the bar 38 is positioned in proximity to the delivery end thereof. As shown, the bar 37, which is the closer to the feed end, extends downwardly from the upper edge of the hopper to a position about 30° short of a position vertically below the axis of the auger while the bar 38, positioned at the discharge end of the auger, extends to a position about 30° therepast.

Each of the bars 37, 38 as above noted is secured at its upper end to the forward wall of the compartment. Additionally, the rods are supported by the compartment wall at a point somewhat below the upper ends of the rods but preferably not below about the point 13, shown in Fig. 3. To afford such additional support, the rods may be secured to the wall at 13, as shown in Fig. 3, or, if desired, a stop may be secured to the wall of the compartment in line with either bar and on the side of the bar toward the baling compartment. The bars are flexible so they will give somewhat under the action of a heavy feed of straw and are resilient so they will spring back into their original position.

A rod 39 is secured to the flight of the auger and is curved so that, in general, points therealong are equally spaced from the axis of the auger. The end of the rod 39 away from its point of securement is slightly curved inwardly toward the axis. The rod is secured to the flight of the auger a short distance from the delivery end of the flight and is at an angle to the axis of the auger opposite to the angle of the flight. Thus, in the machine shown, the rod 39 is substantially perpendicular to the auger flight. Positioning of the rod 39 as described results in the sense of the rod 39 being opposite to the sense of the flight of the auger.

It has been noted above that a right hand auger may be employed and turned in the opposite direction. In case such an anuger is employed, the rods 37, 38 should be relocated to extend downwardly and toward the discharge from points on the rear wall of the hopper.

In order to provide for the clearing of unusually heavy feeds of straw which would mat and therefore not be spiraled into bale form by the above described structure, I provide a mechanism whereby the two feed belts may be moved relatively apart by a heavy feed of straw. When this relative motion is of sufficient magnitude, the drive of one of the belts is released. Thus, as shown in Figs. 6 and 7, the upper belt 17 is provided not only with the end rollers 29 and 40 but also with an intermediate roller 41. The shafts of the rollers 29 and 41 are movable vertically in slots 42 and 43, respectively. A spring 44 anchored to the machine frame is operatively connected to intermediate roller 41 in order to bias the belt 17 toward the lower belt 16. A particularly heavy feed of straw will elevate the belt 17 against the action of gravity and of the spring 44. The drive chain 28' passes around sprockets secured on the auger shaft, on the shaft of the roller 20, and on the shafts 45, 46 of the rollers 29 and 41, respectively. A spring-pressed idle roll 47 is positioned in engagement with the run of the chain 28' between the auger and the roll 20 in order to take up slack in the chain. A second drive chain 48 engages a second pair of sprockets secured on the shafts 45, 46.

A pair of rods 47' are journaled at their upper ends on the shaft 45 and may, if desired, be provided with means to adjust the length thereof, such as the turnbuckle 49, shown in detail in Fig. 8. Adjacent the lower end of each rod 47', a sector gear 50 is pivoted on a stub shaft 51 which is mounted on the machine frame. An arm 52 is secured to each sector gear 50 and is provided at the outer end thereof with a pin 53 which extends through an opening in the lower end of rod 47'. Gears 54 are rotatably mounted on shafts 55 which are so positioned that the gears 54 mesh with the sector gears 50. Each gear 54 is provided with an arcuate slot 56 and with a pin 57 in the portion thereof which is forward when the belt 17 is in lowered position. The slot 56 is arcuate upward, and considered with respect to the radius extending through the center of curvature of the slot, the inner end of the slot extends across this radius a slight distance. The pin 57 is located approximately in this radius near the edge of the gear.

A pair of rods 58 have their upper ends bent at an angle to extend through slots 56 in the pair of gears 54 and are provided at their lower ends with openings through which extend the ends of the shaft of the lower roll 59 of the lower belt 16. These rods 58 extend through vertical slots in guides 60 and are provided with springs 61 to urge them upwardly. Each rod 58 comprises an upper section 62 provided near its lower end with a collar 63 and with a pin 64 between the collar and the end of the section. The rods 58 also comprise a lower section 65, the upper end 66 of which is tubular and is provided with a longitudinal slot 67 in the tubular portion. The upper section 62 is arranged to slide in the tubular end 66 of the lower section 65, with the pin 64 moving in the slot 67 thereby limiting the relative movement of the two sections. A spring 68 is interposed between the collar 63 and the tubular portion whereby to maintain the rod 58 normally in extended position.

The function of the above described mechanism is to allow some upward movement of the belt 17 without changing the pressure exerted by the rods 58 on roller 59, but upon further movement of belt 17 upward to cause the rod 58 to reduce the pressure applied to the roller 59 and to cause this roller to move rearwardly in the slots 69. This same function may be performed by various mechanisms, such, for instance, as that shown in Fig. 9, in which the rod 47 is pivotally connected to lever 70 which is pivoted on a stub shaft 71. The rod 58' is of one piece construction and is connected to the roller 59, as shown and described in connection with Fig. 6. This rod 58' is slidably carried in an arm 72 mounted on the frame and is provided with a collar 73 below the arm 72. A compression spring 74 surrounds the rod 58' and is positioned between the arm 72 and the collar 73. The rod 58 is of such length and the lever 70 is so proportioned that initially upon raising of the belt 17 the lever will move freely but upon further movement an arm of the lever engages the head of rod 58' whereby the rod is drawn rearwardly against the action of spring 74.

In operation, the straw is gathered from the ground and fed by the pick-up 14 and the spinners 18 to the belts 16 and 17. As the straw moves rearwardly between the belts, it is moved to the side of the machine adjacent the feed end of the auger whereby it is directed to the feed end of the auger by director 33. An especially heavy feed of straw will move the director 33 toward the side wall. As the straw emerges from the rearward end of the belts 16, 17, it is directed downwardly by the roll 20 to the lower part of the hopper 19. There is a tendency in baling machines of the auger type for masses of straw to be translated in the hopper by the auger without being spiralled into the desired bale form. Some of the straw will be spiralled by the auger flight. However, much of it will be translated and will contact the bar 39 which will guide such translated straw around the lower wall of the hopper and in the direction of movements of the auger. As a practical matter, while the bar 37 should be quite effective, and alone does produce a substantial improvement, I have found it desirable to add a second bar 38. The combination of these two bars functions to distribute the straw completely around the bale while either bar alone, even if lengthened, does not result in the straw being evenly distributed about the bale. As the bars 37, 38 lie in vertical planes angularly related to the axis of the auger, they offer the greatest resistance to translation at the upper end thereof and allow greater translatory movement after the spiralling has started.

When the feed of straw to the baler is light, the bars 37 and 38 will function as above described. When, however, the feed is heavy, the bars, if fixed in their normal position, would offer too much resistance which would cause the straw to jump over the bars and be translated instead of being spiraled. For this reason the bars are secured at their upper ends and are resilient so that the angle with respect to the axis of the auger is reduced when operating on a heavy feed. Thus the resistance is reduced and the straw therefore follows the path of the bars. Due to the bars being resilient, the machine has a wide flexibility of operation.

The bar 39 acts as a drag both to assist in dragging the straw completely around in a spiral and also as a drag in the delivery of the straw. Thus, with the auger shown rotating clockwise, the bar 38 tends to retard the delivery of straw and to push it back into the auger so that some of the straw forms a very tight spiral. The auger delivers the straw to the baling compartment where it is tied in the known manner.

Occasionally a baler will encounter an unusually large amount of straw in a single place in a windrow. In this event, after the straw is picked up and condensed between the belts 16, 17 and directed to the end of the auger remote from the baling compartment, there will be so much straw that it may become jammed. In such a case, the straw raises the upper belt 17 thereby raising the rod 47'. After an initial free movement of the rod 47', further movement causes actuation of a clutch to disengage the drive of the lower belt. In the machine shown in Fig. 6, the lower belt and one of the supporting rollers therefor are employed as a disengaging clutch. Raising of rod 47' causes the sector gear 50 to turn clockwise and the gear 54 to turn counterclockwise. During the time the gear 54 turns its initial 60°, the rod 58 moves in a direction substantially perpendicular to the rod. During this time the pressure is not reduced on the lower belt. Further rotation of gear 54 withdraws the rod 58. During the initial period of withdrawal, the section 62 of the rod moves rearwardly to its limit, and subsequently the rod pulls roller 59 rearwardly, guided by slots 69. Withdrawal of roller 59 loosens belt 16 so that rotation of the upper roller does not cause movement of the belt.

When the baler is in the position just previously described, the upper belt 17 continues to move. With the lower belt 16 stationary, the upper belt pulls to pieces the mass of straw which has become jammed. When sufficiently cleared, the straw will allow the upper belt to move to its lower position, the stop 75 preventing the belt 17 from interfering with operation of the condensers 18. Lowering of the belt will effectuate just the reverse of the disengaging operation above described. This mechanism for engaging and disengaging the drive of one of the belts cooperates with the spiraling baler by eliminating the one situation in the feed of straw which the baler is incapable of handling.

When the type of mechanism shown in Fig. 9 is employed, raising of the rod 47 turns lever 79, at first freely, after which the lever engages the head of spring-pressed rod 58' and withdraws it, thereby relieving the pressure on the roller 59.

My invention is above described in connection with a pick-up baler, though it will be apparent by inspection this invention is not limited to combination with a pick-up but is of application broadly with balers of the auger type.

Having now described my invention, I claim:

1. A baling machine comprising an auger, a hopper in which the auger is arranged to rotate, a baling compartment communicating with said hopper and positioned to receive straw from said auger, means to direct substantially all of the straw to the end of said auger distant from said baling compartment, and means secured to the wall of the hopper in proximity to the end of the auger proximal to said baling compartment for directing translating straw around said auger.

2. A baling machine comprising an auger, a hopper in which the auger is arranged to rotate, a baling compartment communicating with said hopper and positioned to receive straw from said auger, means to direct substantially all of the straw to the end of said auger distant from said baling compartment, and means comprising a rod secured to the wall of the hopper extending angularly between the auger and the hopper wall whereby straight translation of straw along the auger is hindered and spiral movement of translating straw is induced.

3. A baling machine comprising an auger, a hopper in which the auger is arranged to rotate, a baling compartment communicating with said hopper and positioned to receive straw therefrom, means to feed substantially all of the straw into one side of the hopper above said auger, means to direct straw to the end of said auger distant from said baling compartment, and guide means secured to the hopper wall extending from a position above the auger at the side of the compartment at which straw is fed downwardly between the hopper wall and the auger and outwardly toward the baling compartment.

4. A baling machine comprising an auger, a hopper in which the auger is arranged to rotate, a baling compartment communicating with said hopper and positioned to receive straw from said auger, means to direct substantially all of the straw to the end of said auger distant from said baling compartment, means secured to the wall of the hopper in proximity to the end of the auger proximal to said baling compartment for directing translating straw around said auger, and means secured to the auger in proximity to the discharge end thereof in a position angularly related to the axis of said auger whereby, upon rotation of said auger, it operates as a reverse flight to retard discharge of straw to said baling compartment and to spiral the straw about said auger.

5. A baling machine comprising an auger, a hopper in which the auger is arranged to rotate, a baling compartment communicating with said hopper and positioned to receive straw from said auger, means to direct substantially all of the straw to the end of said auger distant from said baling compartment, means secured to the wall of the hopper in proximity to the end of the auger proximal to said baling compartment for directing translating straw around said auger, and a rod secured to said auger adjacent the discharge end thereof in a reverse flight position.

6. A baling machine comprising an auger, a hopper in which the auger is arranged to rotate, a baling compartment communicating with said hopper and positioned to receive straw from said auger, means to direct substantially all of the straw to the end of said auger distant from said baling compartment, and means spaced from the end of the auger to which the straw is directed, said means being secured to lie between the auger and the lower wall of the hopper and to lie in a plane angularly related to the axis of the auger.

7. A baling machine comprising an auger, a hopper in which the auger is arranged to rotate, a baling compartment communicating with said hopper and positioned to receive straw from said auger, means to direct substantially all of the straw to the end of said auger distant from said baling compartment, and a plurality of rods spaced from the end of the auger to which the straw is directed, which rods are secured to lie between the auger and the lower wall of the hopper and to lie in substantially vertical planes angularly related to the axis of the auger.

8. In a baling machine having an auger, a hopper in which the auger is arranged to rotate, a baling compartment communicating with said hopper and positioned to receive straw from said auger; the combination of a pair of endless belts arranged to feed straw into a side of said hopper parallel to the axis of said auger, a deflector pivoted adjacent said belts and extending angularly therebetween across the path of travel of said belts and toward said hopper, said deflector being movable out of the path of straw between said belts under action of said straw, and spring means to bias said deflector from the latter position into the former position.

9. A structure as defined by claim 1 having on the last flight of the auger a projecting finger which extends from the flight in a direction opposite to the delivery end of the auger.

10. A structure as defined by claim 7 having on the last flight of the auger a projecting finger which extends from the flight in a direction opposite to the delivery end of the auger.

11. A baling machine comprising an auger, a hopper in which the auger is arranged to rotate, a baling compartment communicating with said hopper and positioned to receive straw from said auger, means to deliver straw to said hopper comprising a pair of endless belts, means to drive said belts, and directing means between said belts to direct straw fed by said belts to the end of the auger distant from said compartment.

12. A baling machine comprising an auger, a hopper in which the auger is arranged to rotate, a baling compartment communicating with said hopper and positioned to receive straw from said auger, means to deliver straw to said hopper comprising a pair of endless belts, means to drive said belts, directing means between said belts to direct straw fed by said belts to the end of the auger distant from said compartment, said belts converging in the direction of said hopper, the converging ends being movable relatively apart, and means responsive to said movement apart to stop one of said belts.

13. A baling machine comprising an auger, a hopper in which the auger is arranged to rotate, a baling compartment communicating with said hopper and positioned to receive straw from said auger, means to deliver straw to said hopper comprising a pair of endless belts, means to drive said belts, said belts converging in the direction of said hopper, the converging ends being movable relatively apart, and clutch means operable in response to said movement apart to disconnect the drive to one of said belts.

WILBERT H. LAMP.